(12) United States Patent
Hopkins et al.

(10) Patent No.: US 7,568,424 B2
(45) Date of Patent: Aug. 4, 2009

(54) METHOD AND APPARATUS FOR SEALING AN ULTRAHIGH-PRESSURE FLUID SYSTEM

(75) Inventors: Jordan J. Hopkins, Seattle, WA (US); Adrian Hawes, Seattle, WA (US)

(73) Assignee: Flow International Corporation, Kent, WA (US)

( * ) Notice: Subject to any disclaimer, the term of this patent is extended or adjusted under 35 U.S.C. 154(b) by 203 days.

(21) Appl. No.: 11/559,308

(22) Filed: Nov. 13, 2006

(65) Prior Publication Data
US 2008/0019851 A1 Jan. 24, 2008

Related U.S. Application Data

(63) Continuation-in-part of application No. 10/423,661, filed on Apr. 25, 2003, now Pat. No. 7,247,006, which is a continuation-in-part of application No. 10/038,507, filed on Jan. 2, 2002, now Pat. No. 6,802,541.

(51) Int. Cl.
*F16J 15/16* (2006.01)
*F04B 17/00* (2006.01)

(52) U.S. Cl. .................................... 92/165 R; 417/415

(58) Field of Classification Search ............... 92/165 R, 92/168; 417/415
See application file for complete search history.

(56) References Cited

U.S. PATENT DOCUMENTS

| | | | |
|---|---|---|---|
| 2,321,927 A | 6/1943 | McCoy et al. ................ 286/27 |
| 3,429,581 A | 2/1969 | Himmel ..................... 277/180 |
| 3,877,113 A | 4/1975 | Reyes ....................... 24/115 M |
| 4,181,332 A | 1/1980 | Neumann ................ 285/334.4 |
| 4,239,244 A | 12/1980 | Brent ....................... 277/188 R |
| 4,540,205 A | 9/1985 | Watanabe et al. ........... 285/329 |
| 4,817,962 A | 4/1989 | Mott et al. ..................... 277/1 |
| 5,002,316 A | 3/1991 | Chohan ....................... 285/110 |
| 5,007,276 A | 4/1991 | Kadis et al. .................... 72/351 |
| 5,120,084 A | 6/1992 | Hashimoto ................... 285/156 |
| 5,143,410 A | 9/1992 | Takikawa ..................... 285/197 |
| 5,172,939 A | 12/1992 | Hashimoto .................... 285/24 |
| 5,350,200 A | 9/1994 | Peterson et al. ............... 285/92 |
| 5,489,127 A | 2/1996 | Anglin et al. ................ 285/328 |
| 5,493,954 A | 2/1996 | Kostohris et al. ............. 92/168 |

(Continued)

FOREIGN PATENT DOCUMENTS

DE    801 602    1/1951

(Continued)

*Primary Examiner*—Thomas E Lazo
(74) *Attorney, Agent, or Firm*—Seed Intellectual Property Law Group PLLC

(57) ABSTRACT

A seal carrier is provided for an ultrahigh-pressure fluid system having a plunger configured to reciprocate therein along a longitudinal axis when the ultra-high pressure fluid system is in operation, the seal carrier having an inner surface provided with a first portion configured to captively receive a seal, substantially preventing displacement of the seal in a direction substantially parallel to the longitudinal axis, and a second portion configured to circumferentially surround a bearing. The seal carrier is further provided with an outer surface having a recess formed along at least a portion of a circumference thereof, the recess at least partially positioned opposite the first portion of the inner surface along a lateral axis substantially perpendicular to the longitudinal axis.

44 Claims, 7 Drawing Sheets

U.S. PATENT DOCUMENTS

| | | | |
|---|---|---|---|
| 5,588,680 A | 12/1996 | Cassel et al. | 285/3 |
| 5,667,255 A | 9/1997 | Kato | 285/133.4 |
| 5,725,259 A | 3/1998 | Dials | 285/334.4 |
| 6,045,162 A | 4/2000 | Haibara | 285/55 |
| 6,045,165 A | 4/2000 | Sugino et al. | 285/333 |
| 6,086,070 A * | 7/2000 | Tremoulet et al. | 277/586 |
| 6,162,031 A | 12/2000 | Tremoulet, Jr. et al. | 417/596 |
| 6,241,492 B1 | 6/2001 | Pacht | 417/567 |
| 6,279,965 B1 | 8/2001 | Kida | 285/268 |
| 6,305,693 B1 | 10/2001 | Wehrle | 277/377 |
| 6,312,022 B1 | 11/2001 | Brophy, III et al. | 285/268 |
| 2003/0197377 A1 | 10/2003 | Hopkins et al. | 285/334.4 |

FOREIGN PATENT DOCUMENTS

| | | |
|---|---|---|
| GB | 1 344 894 | 1/1974 |
| GB | 1 397 493 | 6/1975 |
| GB | 2 022 726 A | 12/1979 |
| WO | 98/46881 | 10/1998 |
| WO | 99/14500 | 3/1999 |
| WO | 2004/097221 | 11/2004 |

* cited by examiner

METHOD AND APPARATUS FOR SEALING AN ULTRAHIGH-PRESSURE FLUID SYSTEM

CROSS-REFERENCE TO RELATED APPLICATION

This application is a continuation-in-part of U.S. patent application Ser. No. 10/423,661, entitled "Method and Apparatus for Sealing an Ultrahigh-Pressure Fluid System," filed Apr. 25, 2003, which application is still pending and a continuation-in-part of U.S. patent application Ser. No. 10/038,507, entitled "Components, Systems, and Methods for Forming a Gasketless Seal Between Like Metal Components in an Ultrahigh-Pressure System," filed Jan. 2, 2002, which application has been issued U.S. Pat. No. 6,802,541.

BACKGROUND OF THE INVENTION

1. Field of the Invention

The present invention relates to ultrahigh-pressure fluid systems, and in particular, to methods and assemblies for sealing ultrahigh-pressure systems, such as ultrahigh-pressure pumps.

2. Description of the Related Art

High-pressure pumps and ultrahigh-pressure pumps draw a volume of fluid into the pump on an intake stroke of a plunger, and on a pressure stroke of the plunger, pressurize the volume of fluid to a desired pressure, up to and beyond 87,000 psi. The pressurized fluid flows through a check valve body to an outlet check valve. If the pressure of the fluid is greater than a biasing force provided by high-pressure fluid in an outlet area acting on a downstream end of the outlet check valve, the high-pressure fluid overcomes the biasing force, and passes through the outlet check valve to the outlet area. Typically, a pump has multiple cylinders, and pressurized fluid from the outlet area of each pump is collected in an accumulator. High-pressure fluid collected in this manner is then selectively used to perform a desired function, such as cutting or cleaning. Such pumps are manufactured, for example, by the assignee of the present invention, Flow International Corporation of Kent, Wash.

Applicants believe it would be desirable in many situations to further optimize the operation of such pumps and the longevity of components thereof at higher pressures. For example, when various pump components, such as dynamic seals, are subjected to high pressures, up to and beyond 87,000 psi, the seals have a limited operational life.

More particularly, as the plunger reciprocates within a bore of the pump cylinder, the plunger passes through a dynamic seal that prevents pressurized fluid in the cylinder from flowing past the plunger into the pump. One such dynamic seal is shown in U.S. Pat. No. 6,086,070 which is incorporated herein by reference in its entirety, and which is assigned to the assignee of the present application, Flow International Corporation. The dynamic seal in U.S. Pat. No. 6,086,070 includes a seal carrier 12 that functions as a backup ring for the seal 18. The seal carrier further includes an annular guidance bearing positioned in an annular groove of the seal carrier, the guidance bearing being axially spaced from the seal. An inner diameter of the seal carrier in the region between the seal and the guidance bearing is larger than an inner diameter of the guidance bearing such that a small gap exists between the seal carrier and the plunger. While such an arrangement operates well at very high pressures, up to and beyond 40,000 psi, the seal tends to extrude through the gap between the seal carrier and plunger when such a dynamic seal is exposed to pressures up to and beyond 87,000 psi.

In yet another dynamic seal, shown in FIG. 1, a plunger 100 reciprocates through a dynamic seal 103 having a plastic seal 104, o-ring 105, and metal hoop seal 106 that are supported by a backup ring 109 made from a bearing material such as aluminum-bronze. The cylinder 102 is tightened along its planar interface with the backup ring 109 by tightening tie rods, as is known in the art. At very high pressures, for example up to and beyond 87,000 psi, the gap between the backup ring 109 and the plunger 100 is not closed uniformly under pressure and again, the seal 104 extrudes through any available gap causing failure of the dynamic seal 103. Given the very short component life, frequent component replacement is required, resulting in down time of the machine, lost productivity, and possible damage to the pump. Not only are such failures due to extrusion of the seal 104, but failure may also result from splitting of the plastic seal 104, and premature o-ring 105 and seal hoop 106 failure caused by relative motion between the high-pressure components. For example, the seal 104 and o-ring 105 can move with respect to adjacent metal parts, wearing the seal 104 and o-ring 105.

Therefore, a need exists for an optimized dynamic sealing assembly that can withstand pressures up to and beyond 87,000 psi and substantially prevent relative motion between its components. The present invention meets this need.

BRIEF SUMMARY OF THE INVENTION

According to one embodiment, a sealing assembly for an ultrahigh-pressure fluid system having a plunger configured to reciprocate therein along a longitudinal axis, comprises a seal having a bore through which the plunger may reciprocate, a bearing positioned adjacent the seal and having a bore through which the plunger may reciprocate, and a seal carrier including an inner surface and an outer surface, a first portion of the inner surface captively receiving the seal, substantially preventing displacement of the seal in a direction substantially parallel to the longitudinal axis, a second portion of the inner surface circumferentially surrounding the bearing.

According to one aspect of the above embodiment, the seal carrier of the sealing assembly further comprises a recess formed along a circumference of at least a portion of the outer surface of the seal carrier at least partially positioned opposite the first portion of the inner surface along a lateral axis substantially perpendicular to the longitudinal axis.

According to another embodiment of the present invention, a seal carrier assembly for an ultrahigh-pressure fluid system having a plunger configured to reciprocate therein along a longitudinal axis, comprises a bearing having a bore through which the plunger may reciprocate, and a seal carrier having an inner surface and an outer surface, a first portion of the inner surface configured to captively receive a seal, substantially preventing displacement of the seal in a direction substantially parallel to the longitudinal axis, and a second portion of the inner surface circumferentially surrounding the bearing.

According to yet another embodiment of the present invention, a seal carrier for an ultrahigh-pressure fluid system having a plunger configured to reciprocate therein, comprises an inner surface having a first portion configured to captively receive a seal, substantially preventing displacement of the seal in a direction substantially parallel to the longitudinal axis, and a second portion configured to circumferentially surround a bearing.

According to still another embodiment of the present invention, an ultrahigh-pressure fluid system comprises a plunger configured to reciprocate in the ultrahigh-pressure fluid system along a longitudinal axis, a seal having a bore through which the plunger may reciprocate, a bearing positioned adjacent the seal and having a bore through which the plunger may reciprocate, and a seal carrier including an inner surface and an outer surface, a first portion of the inner surface captively receiving the seal, substantially preventing displacement of the seal in a direction substantially parallel to the longitudinal axis, a second portion of the inner surface circumferentially surrounding the bearing.

DETAILED DESCRIPTION OF THE INVENTION

In many situations, it would be desirable to optimize an operation of ultrahigh-pressure fluid pumps at higher pressures and improve longevity of components thereof. For example, an ultrahigh-pressure intensifier pump, such as those manufactured by Flow International Corporation, may be used for a variety of applications, such as supplying high-pressure fluid to an abrasive waterjet cutting head, or pressurizing a pressure vessel to pasteurize food products. While the below discussion will use an ultrahigh-pressure intensifier as an example, it will be understood that the present invention has application in sealing an axially reciprocating plunger of any high-pressure pump.

As described previously, a reciprocating plunger in an intensifier reciprocates within a bore of the pump cylinder. Fluid is maintained within a desired pressurizing region of the pump cylinder by a dynamic seal surrounding the plunger. While a variety of such dynamic seals have been used previously, one example is that shown in U.S. Pat. No. 6,086,070. It will be understood from a reading of that patent that a gap exists between the seal carrier and the plunger, in a region adjacent the seal. While such an arrangement performs well at very high pressures, up to and beyond 40,000 psi, the seal tends to extrude unacceptably through the gap between the seal carrier and plunger when such a dynamic seal is exposed to pressures up to and beyond 87,000 psi (6,000 bar).

Figure 1:
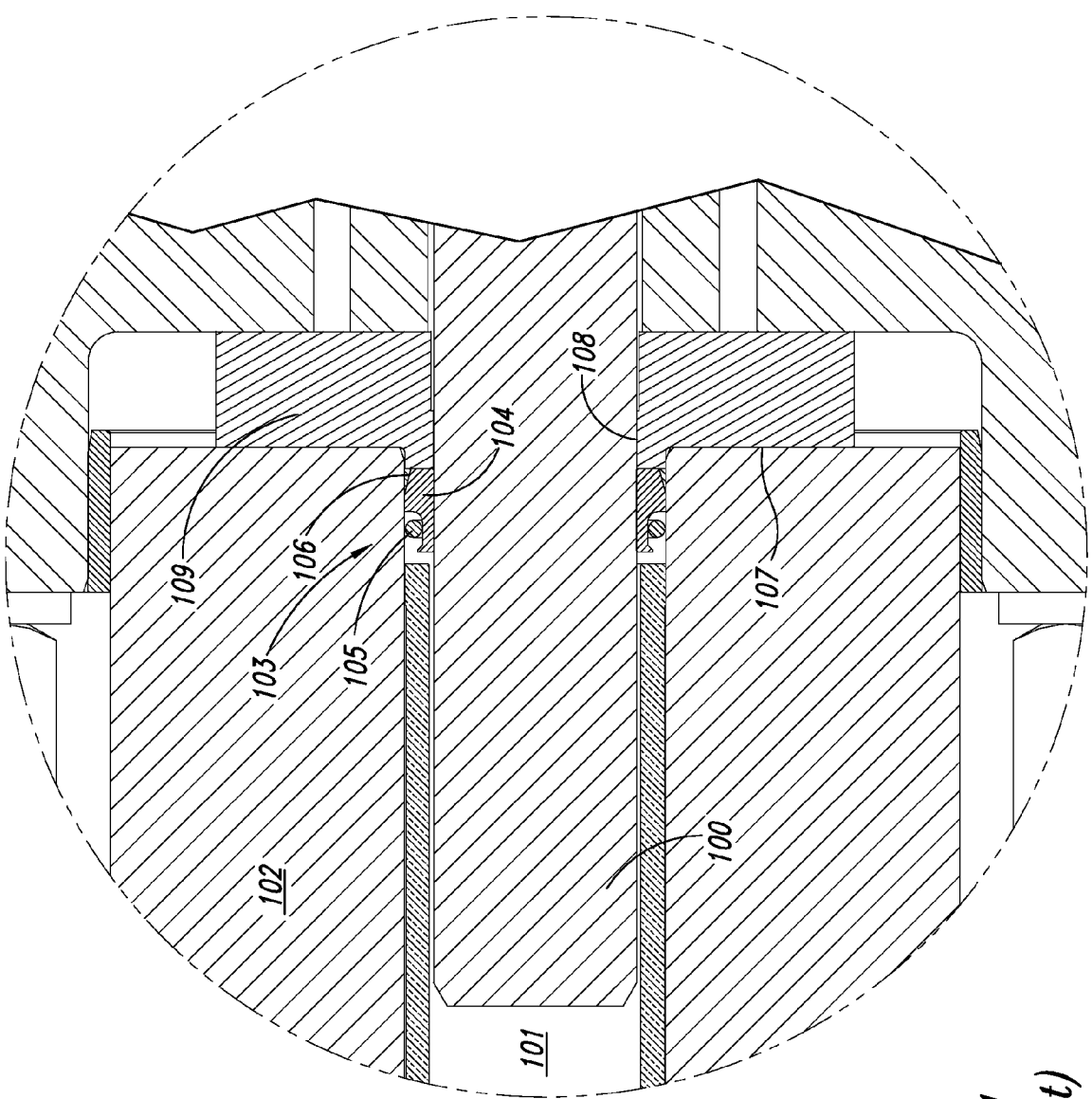
FIG. 1 is a cross-sectional view of a dynamic seal for an ultrahigh-pressure pump provided in accordance with a prior art system.

Another currently available dynamic seal employed to seal a reciprocating plunger, is shown in FIG. 1. As plunger 100 reciprocates within bore 101 of the cylinder 102, fluid within the bore 101 is prevented from flowing past the plunger 100 into the pump by dynamic seal 103. The dynamic seal 103 includes a plastic seal 104, an o-ring 105, and a stainless steel seal hoop 106 that are supported by a backup ring 109 made from a bearing material such as aluminum-bronze. An end surface of the cylinder 102 sits flush against a planar end face of the backup ring 109, forming a planar interface 107. The cylinder 102 is tightened along its planar interface 107 with the backup ring 109, by tightening tie rods, as is known in the art. A small gap 108 exists between the backup ring 109 and the plunger. At very high pressures, for example, above 55,000 psi, the dynamic seal 103 begins to fail at undesirably short intervals. Such failures are believed to be due to many things, including extrusion of the seal 104 through gap 108, splitting of the seal 104, and premature failure of the o-ring 105 and seal hoop 106 caused by relative motion between the high-pressure components. These problems are exacerbated at even higher pressures, for example, up to and beyond 87,000 psi. More particularly, a dynamic seal as shown in FIG. 1 may last less than 40 hours at 87,000 psi. This is an unacceptably short component life, requiring frequent component replacement, down time of the machine, lost productivity, and possible damage to the pump.

Figure 2:
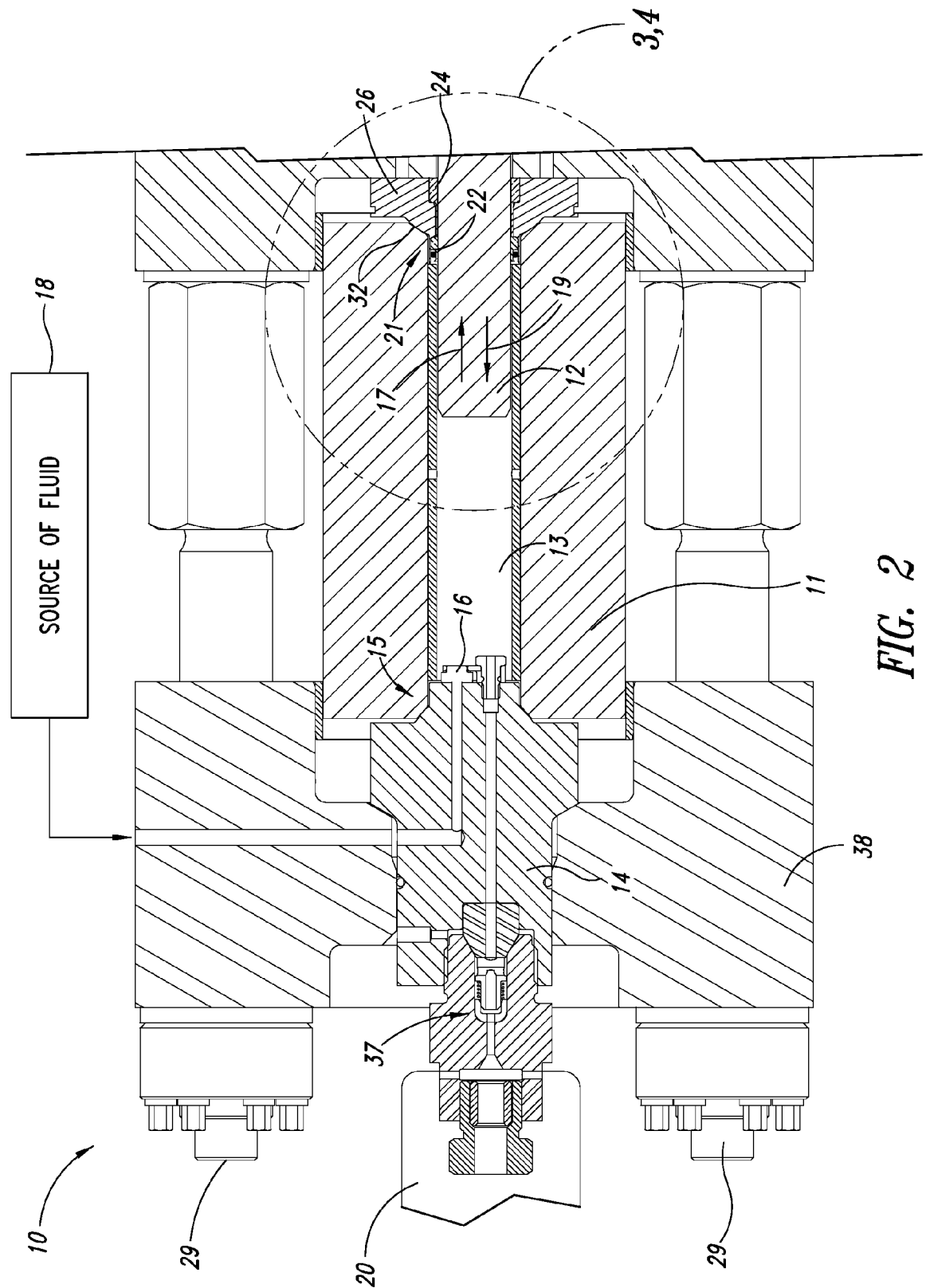
FIG. 2 is a partial cross-sectional plan view of an ultrahigh-pressure pump, incorporating a dynamic seal provided in accordance with an embodiment of the present invention.

An intensifier is able to run reliably at 87,000 psi in accordance with the present invention. As shown in FIG. 2, an ultrahigh-pressure fluid system 10, such as an intensifier pump, is provided with a plunger 12 that may reciprocate within a bore 13 of pump cylinder 11. During operation, the plunger 12 draws a volume of fluid from a source of fluid 18 into the bore 13 via an inlet valve 16 provided in check valve body 14 on an intake stroke of the plunger illustrated by the direction arrow marked 17. On a pressure stroke 19, the plunger 12 pressurizes the volume of fluid, the pressurized fluid flowing through the check valve body 14 to the outlet check valve 37. If the pressure of the pressurized fluid is sufficiently high to overcome the biasing force on the outlet check valve 37, the pressurized fluid passes through the outlet check valve 37 to an outlet area 20, after which the pressurized fluid is collected in an accumulator and used in any desired manner, as is known in the art.

Figure 3:
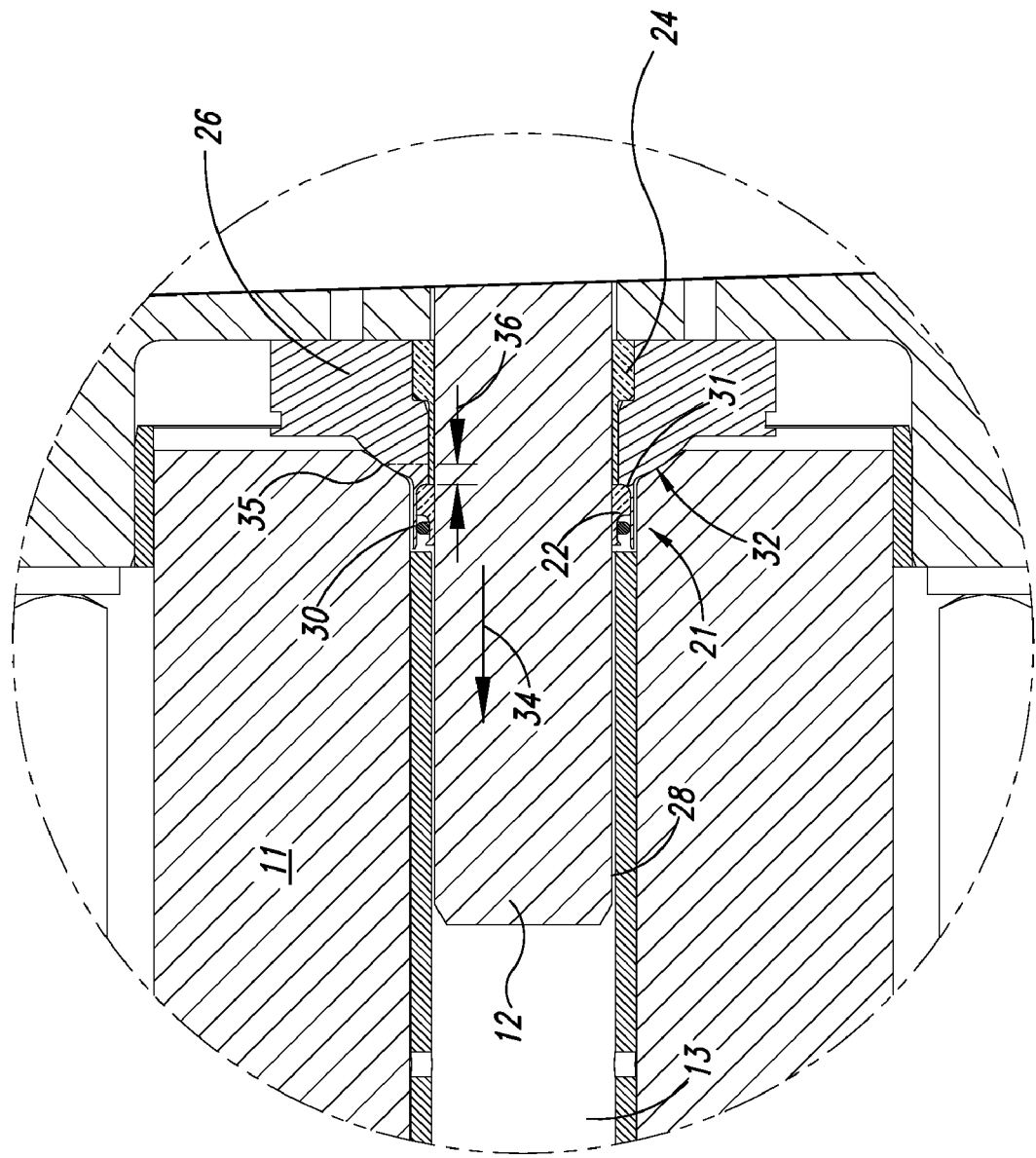
FIG. 3 is an enlarged cross-sectional plan view of the dynamic seal of FIG. 2, shown with a plunger.
Figure 4:
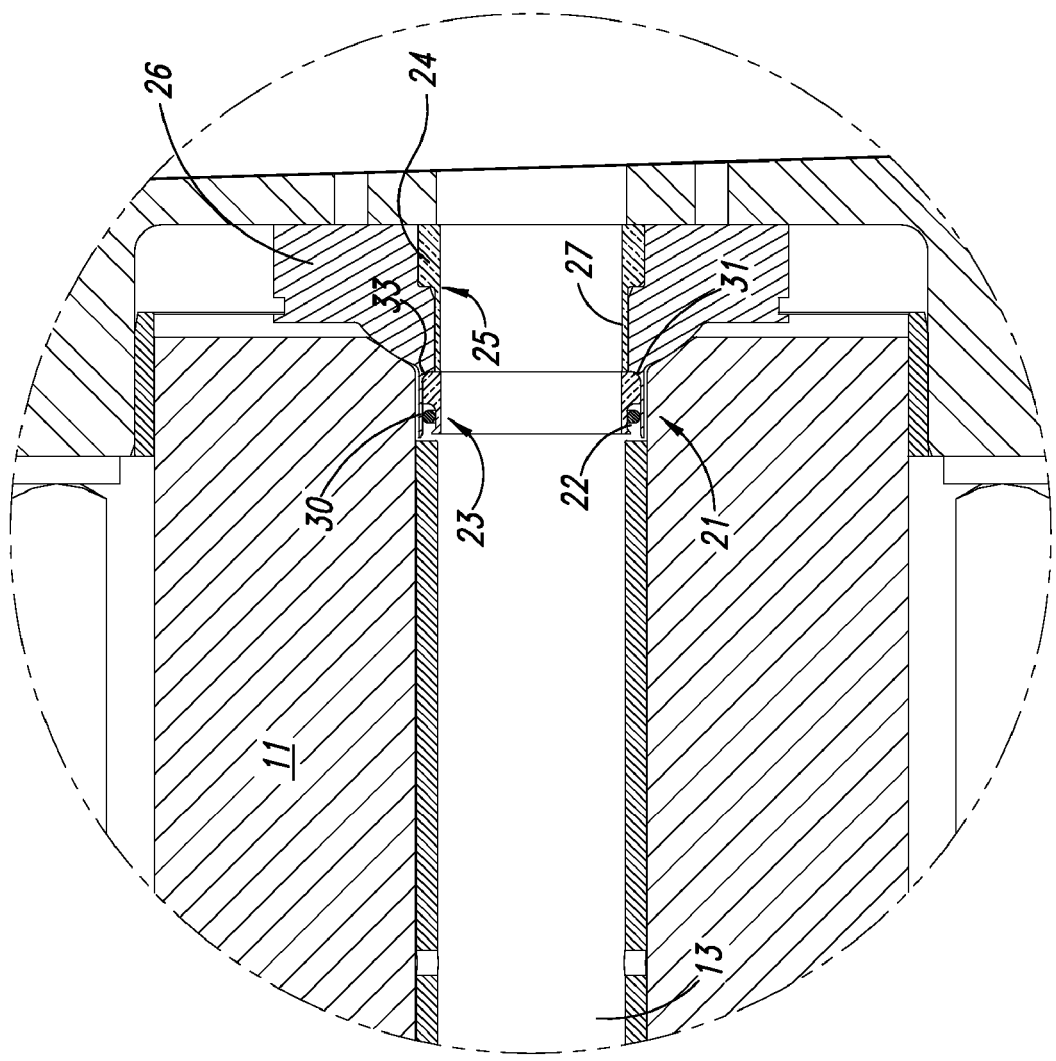
FIG. 4 is an enlarged cross-sectional plan view of the dynamic seal of FIG. 2, shown without a plunger.

As further shown in FIG. 2, and as may be best seen in FIGS. 3 and 4, the plunger 12 reciprocates through a sealing assembly 21 provided in accordance with an embodiment of the present invention. The sealing assembly 21 includes a plastic seal 22, for example made of ultrahigh molecular weight polyethylene. As best seen in FIG. 4, the annular seal 22 is provided with a bore 23 through which the plunger may reciprocate. A bearing 24, is positioned adjacent and/or contiguous the seal 22, and is also provided with a bore 25 through which the plunger 12 may reciprocate. Therefore, the material of the bearing is chosen to be a material which can safely ride along the plunger while the plunger is in motion. While the bearing 24 and plunger 12 may be made of any appropriately cooperative materials, in one embodiment, the bearing 24 is made of a high strength bronze, or aluminum or copper alloy, and the plunger is made from a ceramic material, such as partially stabilized Zirconia (PSZ).

A seal carrier 26 surrounds a circumference of the bearing 24 and is positioned adjacent the seal 22. Although the seal carrier 26 may be made of a variety of materials, in a preferred embodiment, it is made of stainless steel. In accordance with an embodiment of the present invention, the seal carrier 26 is subjected to a compressive force that is sufficiently high to circumferentially collapse the seal carrier 26 uniformly in a radial direction against the bearing 24. This uniform collapse of the seal carrier 26 against the bearing 24 causes an inner surface of the bore 25 through the bearing 24 to achieve substantially uniform circumferential contact with an outer surface 28 of the plunger 12 when the assembly is subjected to ultrahigh pressure, thereby eliminating gaps that occur in prior art systems. In contrast, while a dynamic seal such as that illustrated in the prior art of FIG. 1 may be forced against the plunger under pressure, the closing of the gap between the backup ring 109 and the plunger 100 is not controlled, and does not occur uniformly around the circumference of the plunger. As a result, there may be contact between the backup ring 109 and plunger 100 on one side, and a gap on the other, allowing for the seal 104 to extrude.

Referring to FIG. 2, the compressive force on the seal carrier 26 is achieved by tightening tie rods 29 of the system that load the cylinder 11 via end cap 38 seating the check valve body 14 against a first end 15 of cylinder 11. The cylinder 11 is seated against the seal carrier 26 in such a way as to form a static seal along a tangential sealing area 32, as described in parent application Ser. No. 10/038,507 (U.S. Pat. No. 6,802,541). More particularly, in one embodiment, a radial compressive load is achieved through the compressed contact of a substantially flat tapered mouth of the cylinder against a convexly curved region of the seal carrier. In one embodiment, the included contact angle between the cylinder and backup ring is about 80-128 degrees, with a preferred range of about 100-118 degrees. Alternatively, the seal carrier may have a conical, substantially linear cross-sectional profile that forms an included angle of 80-128 degrees, and that mates against a convex, curved cross-sectional profile of the cylinder to form a substantially circular seal. A contact angle between the adjoining components of the cylinder and seal carrier is tangential to at least one of the components, the tangent measuring between 40 and 60 degrees from a longitudinal axis of the component.

The compressive force applied via the tie rods 29 and the cylinder 11 on the seal carrier 26 is sufficiently great, and is applied in such a manner given the geometry of the system, including the bearing bore, and seal carrier/cylinder contact angle, that the seal carrier 26 deforms onto the bearing 24 in a controlled, uniform manner to substantially eliminate any gap that might exist between the seal carrier 26 and the bearing 24. In turn, the bearing 24 collapses onto the plunger 12 at a free end of the bearing to substantially eliminate any gap between the bearing 24 and the plunger 12, particularly in a region adjacent the seal 22.

By eliminating any gap between the seal carrier and the bearing, and between the bearing and the plunger, when the system is operating at pressure, the present invention eliminates any pathway through which the seal might otherwise extrude, particularly when subjected to high pressures up to and beyond 55,000 psi and more particularly, when subjected to pressures up to and beyond 87,000 psi. As a result, a system provided in accordance with an embodiment the present invention may operate several hundred hours at 87,000 psi, as compared to less than 40 hours using conventional sealing assemblies.

Additionally, the compression of the cylinder 11 onto the seal carrier 26, through the loading of the tie rods 29, creates a metal-to-metal seal at the interface of these two components, namely along the tangential sealing area 32. As a result of the formation of this metal-to-metal static seal, the plastic seal 22 is not required to seal both outwardly, namely in the direction of the cylinder-seal carrier interface, as well as inwardly, namely in the direction of the plunger-seal carrier interface. As a result, opposing forces to which the plastic seal would otherwise be exposed are eliminated, thereby preventing the seal 22 from being pulled apart. Furthermore, the need for a seal hoop as used in prior art systems is eliminated, thereby simplifying the system and relieving problems associated with premature failure of the seal hoop component.

As can be best seen in FIGS. 3 and 4, a first end 33 of the seal 22 is supported across its width by both the bearing 24 and the seal carrier 26. This arrangement eliminates the problematic extrusion gap between the plunger and the seal carrier which occurs in some prior art designs where the seal is supported by only a stainless steel seal carrier, such that a gap must exist between the seal carrier and the plunger adjacent the seal. In addition, the arrangement provided in accordance with the present invention provides greater strength than currently available carriers or back up rings that support the seal across its width by only a bearing material, such as those illustrated in FIG. 1.

As may also be seen in the illustrated embodiment of FIGS. 3 and 4, the seal carrier 26 is provided with a cup 30 that extends along an outer surface 31 of the seal 22, thereby preventing the seal 22 from touching the cylinder 11. The positioning of the cup eliminates relative motion between the seal 22 and the cylinder 11 which would cause fretting of the seal and early failure. Furthermore, as shown in FIG. 3, the first end 33 of the seal 23 is positioned downstream of a center point 35 of the tangential sealing area 32, by a distance 36. ("Downstream" is indicated by reference arrow 34, and is in the direction of the pressurizing stroke of the plunger.) By providing a sealing assembly 21 in accordance with the present invention as shown in FIG. 3, the force of compression on the cup 30 of the seal carrier 26 is greater than the force of expansion on the cup of the seal carrier 26 while at pressure, thereby facilitating the further collapse of the seal carrier 26 onto the bearing 24 and the bearing onto the plunger 12 in order to eliminate the gaps between the seal carrier 26, bearing 24 and plunger 12.

The amount of deformation of the seal carrier 26 is a function of both the angles of the surfaces of the cylinder 11 and seal carrier 26 that form the tangential sealing area 32, and is also a function of the selected materials, as well as the amount of assembly loading, for example, as may be achieved through tightening of tie rods 29. While tie rods 29 are described and illustrated in the present application, it will be understood that the loading at assembly may be accomplished in any available manner.

In one embodiment, the bearing 24 is press fit into the seal carrier 26 and a bore is machined therethrough. The softer the materials, the greater deformation will be achieved, and in turn, a larger bore will be needed, to accommodate a selected plunger. In a preferred embodiment, therefore, a material for the seal carrier 26 having a desired strength is selected, and an inner diameter of the bore through the seal carrier 26 is selected, to achieve a selected amount of contact between the bearing 24 and the plunger 12 for a given compressive force. More particularly, the seal carrier 26 is made of a material whose strength is matched precisely to the final bore machined through the bearing 24, such that the amount of compression applied by the tie rods 29 translates into a controlled amount of contact between the bearing 24 and the high-pressure plunger 12.

Figure 5:
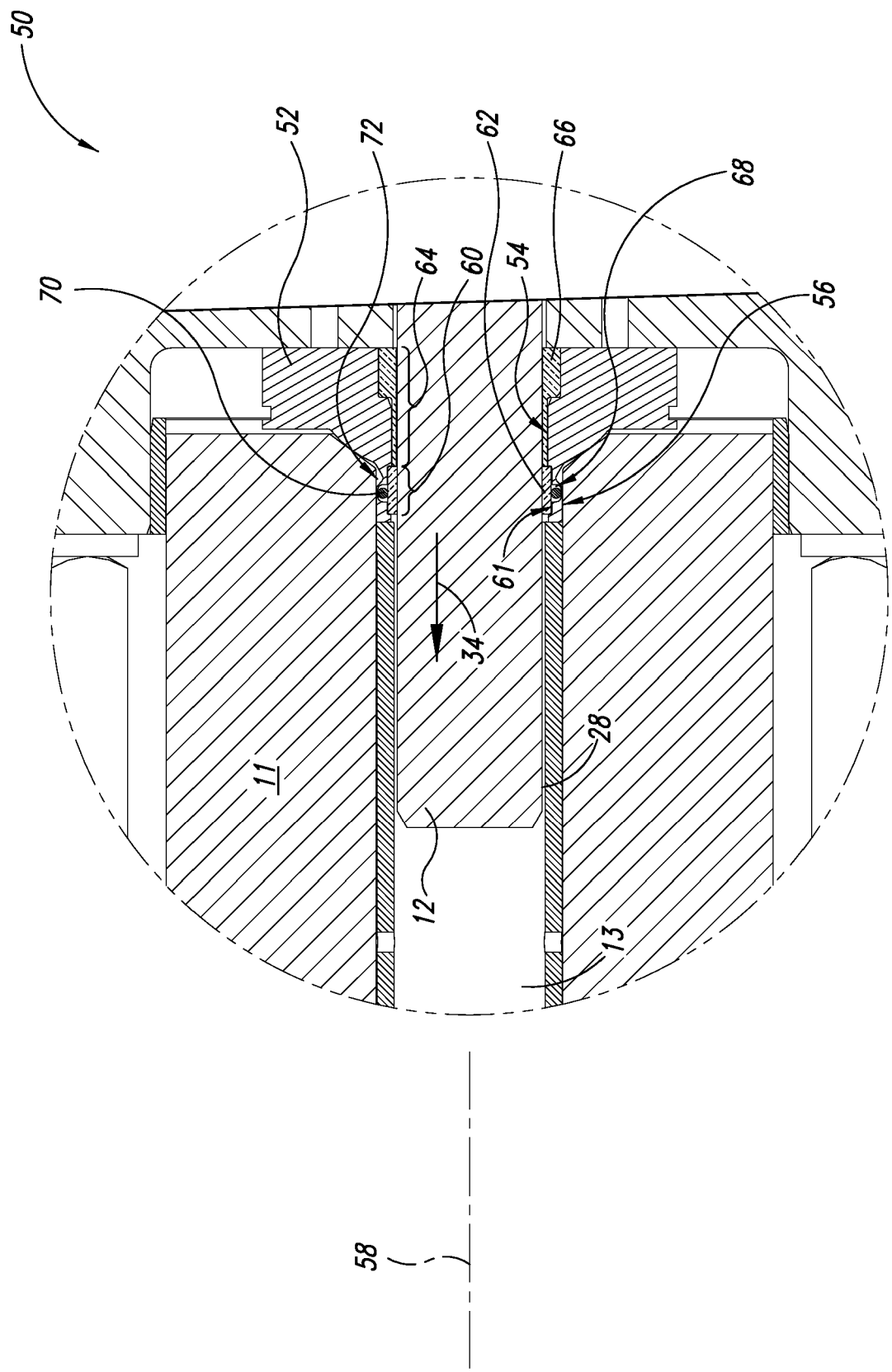
FIG. 5 is an enlarged partial cross-sectional plan view of an ultrahigh-pressure pump, incorporating a dynamic seal provided in accordance with another embodiment of the present invention.
Figure 7:
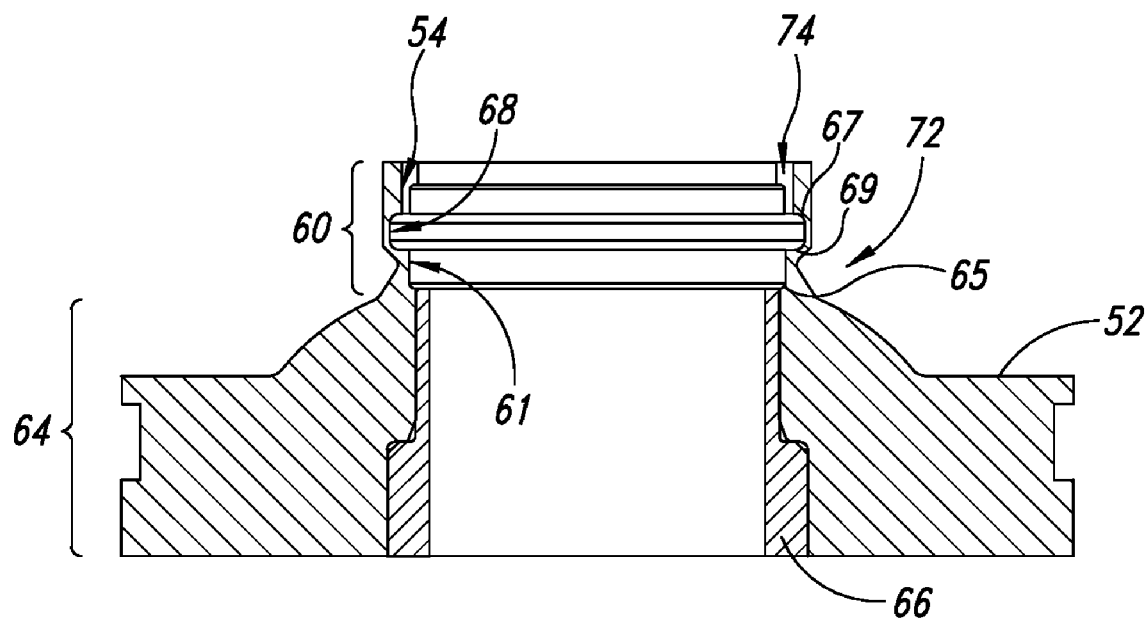
FIG. 7 is a cross-sectional view of the seal carrier and bearing of FIG. 6, viewed across section 7-7.

FIG. 5 illustrates a portion of an ultrahigh-pressure fluid system 50 in accordance with another embodiment of the present invention. The ultrahigh-pressure fluid system 50 comprises a seal carrier 52 having an inner surface 54 proximate the plunger 12 and an outer surface 56 opposing the inner surface 54 along a lateral axis substantially perpendicular to a longitudinal axis 58 along which the plunger 12 may reciprocate. As illustrated in FIGS. 5 and 7, a first portion 60 of the inner surface 54 is configured to circumferentially surround and captively receive a seal 62. For example, a first indent 61 formed in the first portion 60 captively receives the seal 62. A second portion 64 of the inner surface 54 is configured to circumferentially surround a bearing 66, which is positioned adjacent and/or contiguous the seal 62. The inner surface 54 may also include a second indent 68 circumferentially and axially surrounding an o-ring 70. In some embodiments, the second indent 68 is formed in the first indent 61, laterally interposing the o-ring 70 between the seal 62 and the seal carrier 52.

Figure 8:
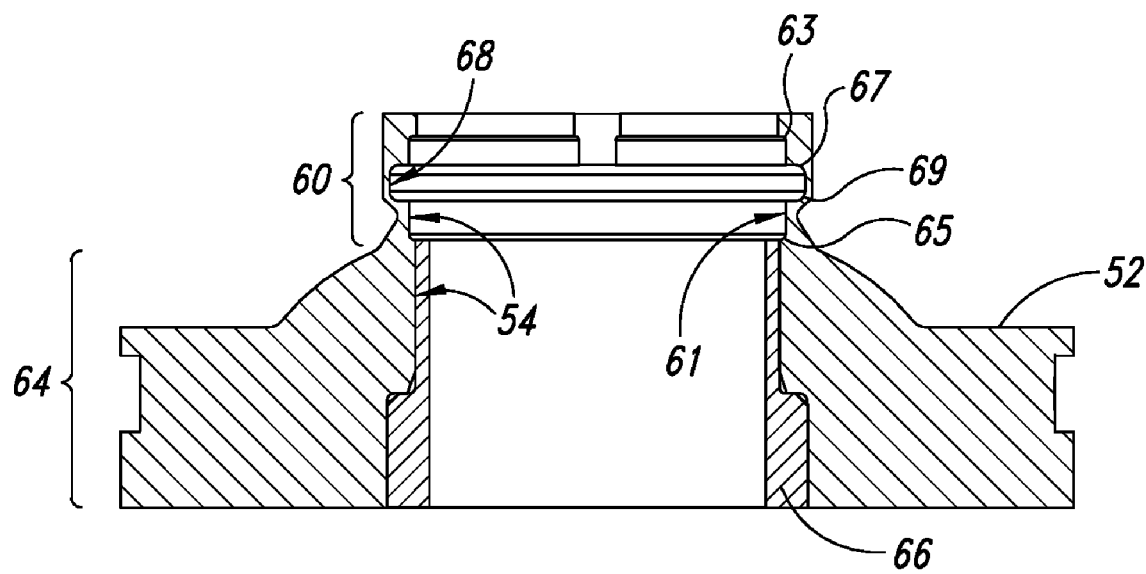
FIG. 8 is a cross-sectional view of the seal carrier and bearing of FIG. 6, viewed across section 8-8.

In one embodiment, as illustrated in FIGS. 7 and 8, the first indent 61 includes first and second shoulders 63, 65 positioned on opposing longitudinal ends of the first indent 61. The first and second shoulders 63, 65 and a longitudinal portion of the indent 61 interposed therebetween cooperate to captively receive the seal 62 (FIG. 5). Similarly, the second indent 68 includes first and second shoulders 67, 69 and a longitudinal portion therebetween, which together circumferentially and longitudinally surround the o-ring 70 (FIG. 5), laterally interposing the o-ring between the longitudinal portion of the second indent 68 and the seal 62.

Accordingly, the seal carrier 52 of the ultrahigh-pressure fluid system 50 substantially prevents any potential displacement of the seal 62 and the o-ring 70. The o-ring 70 is laterally interposed between the seal 62 and the longitudinal portion of the second indent 68. Therefore, the o-ring 70 will not substantially displace laterally. Furthermore, the first and second shoulders 67, 69 of the first indent 61 substantially prevent any potential longitudinal displacement of the seal 62. Consequently, any displacement of the o-ring 70, which may otherwise occur due to displacement of the seal 62, is also substantially prevented. Therefore, any rubbing that may otherwise exist between the seal 62 and the seal carrier 52 or between the o-ring 70 and the seal carrier 52, is substantially prevented, further extending the life of the seal 62 and the o-ring 70.

The seal carrier 52 of the ultrahigh-pressure fluid system 50 further comprises a recess 72 formed along a circumference of at least a portion of the outer surface 56 of the seal carrier 52. In absence of the recess 72, stresses induced by forces exerted on the seal carrier 52, such as compressive forces that may be exerted by the cylinder 11, tend to concentrate at the first portion 60 of the inner surface 54 toward an end thereof proximate the second portion 64 and at the second portion 64 toward an end thereof proximate the first portion 60. The recess 72 reduces a wall thickness of the seal carrier 52 in an area where the recess 72 is formed and promotes a distribution of stresses in a less concentrated manner across at least a portion of a cross-sectional area of the seal carrier 52. Accordingly, a magnitude of a maximum stress induced on a cross-sectional area of the seal carrier 52 is reduced and a durability of the seal carrier 52 and thus of the ultrahigh-pressure fluid system 50 is improved.

Figure 6:
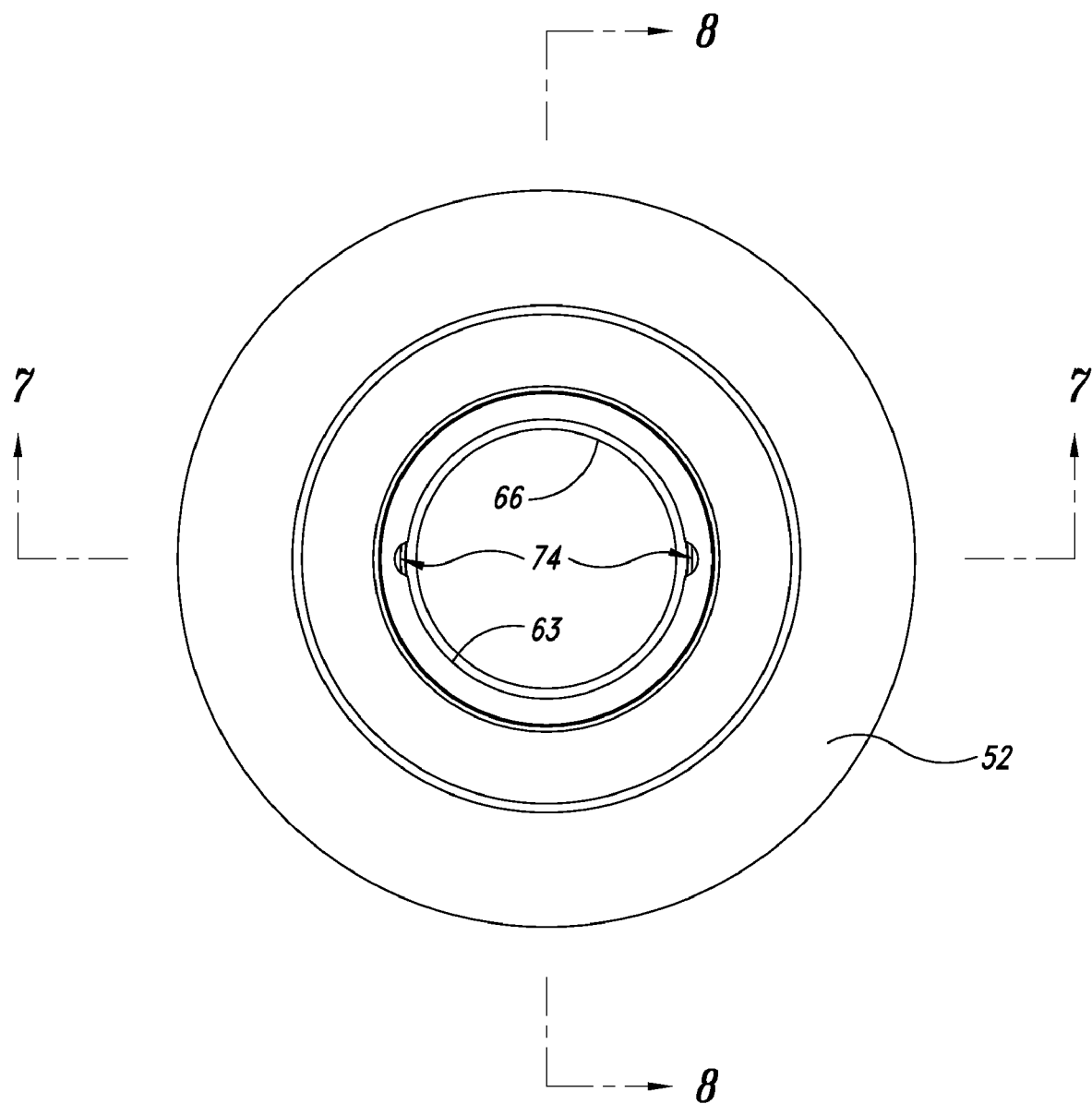
FIG. 6 is a plan view of a seal carrier and bearing of the ultrahigh-pressure pump of FIG. 5.

FIGS. 6, 7 and 8 better illustrate the seal carrier 52 including the bearing 66. The recess 72 may take any shape gradually varying a cross-sectional area of the seal carrier 52. For example, the recess 72 may comprise a substantially arrowhead shaped cross-section with a curvilinear apex pointing toward the inner surface 54, or it may comprise other linear and curvilinear portions, a semi-circular or semi-elliptical shape, or a triangular shape with a curved apex, or any other shape having curved corners or apices. In some embodiments, a minimum wall thickness of the seal carrier 52 may be located at the apex of the arrowhead-shaped recess 72. Alternatively, in other embodiments, a minimum wall thickness of the seal carrier 52 may be located at the second indent 68. In some embodiments, the recess 72 is formed proximate an area in the seal carrier 52 where the first and second portions 60, 64 coincide. For example, as illustrated in FIG. 7, the recess 72 can be formed along the circumference of at least a portion of the outer surface 56 of the seal carrier 52, at least partially positioned laterally opposite the first portion 60 of the inner surface 54.

Furthermore, as illustrated in FIGS. 6 and 7, in some embodiments, the seal carrier 52 may further comprise at least one vent 74, or two opposing vents 74. The vents 74 allow water that may potentially seep between the seal carrier 52 and the seal 62, to vent away from this region, for example to a surrounding environment. The surrounding environment may include the bore 13 in which the plunger 12 may reciprocate. Therefore, the vent or vents 74 are in fluid communication with the surrounding environment and at least a portion of the inner surface 54 of the seal carrier 52, communicating any collected liquid from adjacent the inner surface 54 to the surrounding environment. The vents 74 may comprise any feature such as a recess, indentation, gutter, cup or any other feature having a cross-sectional shape that has linear and/or curvilinear portions, such as a semi-circular or semi-elliptical shape adapted to receive the o-ring in at least a portion thereof. The vents 74 also extend longitudinally to fluidly communicate with regions adjacent the seal carrier 52 prone to potential water collection, as discussed above.

As described previously, an ultrahigh-pressure fluid system provided in accordance with an embodiment of the present invention allows the system to operate reliably at pressures up to and beyond 87,000 psi, while maintaining a seal around a reciprocating plunger of the system. While the present invention enables reliable operation at pressures which cause failures in prior art systems, optimizing and making the invention particularly beneficial at these higher pressures, it will be understood that the present invention also has application at lower pressures, up to and beyond 40,000 psi. The present invention therefore provides significant advantages. From the foregoing it will be appreciated that, although specific embodiments of the invention have been described herein for purposes of illustration, various modifications may be made without deviating from the spirit and scope of the invention. Accordingly, the invention is not limited except as by the appended claims and their equivalents.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A sealing assembly for an ultrahigh-pressure fluid system having a plunger configured to reciprocate therein along a longitudinal axis, the sealing assembly comprising:
   a seal having a bore through which the plunger may reciprocate;
   a bearing positioned adjacent the seal and having a bore through which the plunger may reciprocate;
   a seal carrier including an inner surface and an outer surface, a first portion of the inner surface receiving the seal, and a second portion of the inner surface circumferentially surrounding the bearing; and
   a recess formed along a circumference of the outer surface of the seal carrier, in a region on the outer surface at least partially opposite the first portion of the inner surface.

2. The sealing assembly of claim 1 wherein the first portion of the inner surface captively receives the seal.

3. The sealing assembly of claim 1, wherein the recess comprises a substantially arrowhead shaped cross-section having a curvilinear apex and pointing toward the inner surface of the seal carrier.

4. The sealing assembly of claim 1 wherein the recess is configured to promote a distribution of stresses induced on the seal carrier across at least a portion of a cross-section of the seal carrier.

5. The sealing assembly of claim 1 wherein the first portion of the inner surface circumferentially surrounds the seal.

6. The sealing assembly of claim 1 wherein the first portion of the inner surface comprises a first indent captively receiving the seal.

7. The sealing assembly of claim 6, further comprising:
an o-ring wherein the first indent comprises a second indent formed in the inner surface of the seal carrier, circumferentially and longitudinally surrounding the o-ring, the o-ring being interposed between the seal and a portion of the inner surface forming at least a portion of the second indent.

8. The sealing assembly of claim 1 wherein the seal carrier further comprises at least one vent configured to be in fluid communication with a surrounding environment and at least a portion of the inner surface of the seal carrier, the vent being configured to communicate fluid from adjacent the inner surface to the surrounding environment.

9. A seal carrier assembly for an ultrahigh-pressure fluid system having a plunger configured to reciprocate therein along a longitudinal axis, the seal carrier assembly comprising:
a bearing having a bore through which the plunger may reciprocate;
a seal carrier having an inner surface and an outer surface, a first portion of the inner surface configured to receive a seal, and a second portion of the inner surface circumferentially surrounding the bearing; and
a recess formed along a circumference of the outer surface of the seal carrier, in a region on the outer surface at least partially opposite the first portion of the inner surface.

10. The seal carrier assembly of claim 9 wherein the first portion of the inner surface is configured to captively receive the seal.

11. The seal carrier assembly of claim 9 wherein the recess comprises a substantially arrowhead shaped cross-section having a curvilinear apex and pointing toward the inner surface of the seal carrier.

12. The seal carrier assembly of claim 9 wherein the recess is configured to promote a distribution of stresses induced on the seal carrier across at least a portion of a cross-section thereof.

13. The seal carrier assembly of claim 9 wherein the first portion of the inner surface is configured to circumferentially surround the seal.

14. The seal carrier assembly of claim 9 wherein the first portion of the inner surface comprises a first indent configured to captively receive the seal.

15. The seal carrier assembly of claim 14 wherein the first indent comprises a first shoulder, a second shoulder and a longitudinal portion interposed between the first and second shoulders.

16. The seal carrier assembly of claim 14 wherein the inner surface of the seal carrier comprises a second indent configured to circumferentially and longitudinally surround an o-ring.

17. The seal carrier assembly of claim 9, further comprising:
at least one vent configured to be in fluid communication with a surrounding environment and at least a portion of the inner surface of the seal carrier, the two vents being configured to communicate fluid from adjacent the inner surface to the surrounding environment.

18. A seal carrier for an ultrahigh-pressure fluid system having a plunger configured to reciprocate therein, the seal carrier comprising:
an outer surface;
an inner surface having a first portion configured to receive a seal, and a second portion configured to circumferentially surround a bearing; and
a recess formed along a circumference of the outer surface of the seal carrier, in a region on the outer surface at least partially opposite the first portion of the inner surface.

19. The seal carrier of claim 18 wherein the first portion of the inner surface is configured to captively receive the seal.

20. The seal carrier of claim 18 wherein the recess comprises a substantially arrowhead shaped cross-section having a curvilinear apex and pointing toward the inner surface of the seal carrier.

21. The seal carrier of claim 20 wherein a minimum wall thickness of the seal carrier is located at the apex of the arrowhead shaped cross-section.

22. The seal carrier of claim 18 wherein the recess comprises at least one of a partially circular shape and a partially elliptical shape.

23. The seal carrier of claim 18 wherein the recess is configured to promote a distribution of stresses induced on the seal carrier across at least a portion of a cross-section of the seal carrier.

24. The seal carrier of claim 18 wherein the first portion of the inner surface is configured to circumferentially surround the seal.

25. The seal carrier of claim 18 wherein the first portion of the inner surface comprises a first indent configured to captively receive the seal.

26. The seal carrier of claim 25 wherein the first indent comprises a first shoulder, a second shoulder and a longitudinal portion interposed between the first and second shoulders.

27. The seal carrier of claim 25 wherein the inner surface comprises a second indent configured to circumferentially and longitudinally surround an o-ring.

28. The seal carrier of claim 27 wherein the second indent is formed in the first indent.

29. The seal carrier of claim 27 wherein a minimum wall thickness of the seal carrier is located at the second indent.

30. The seal carrier of claim 18, further comprising:
at least one vent configured to be in fluid communication with a surrounding environment and at least a portion of the inner surface of the seal carrier, the vent being configured to communicate fluid from adjacent the inner surface to the surrounding environment.

31. The seal carrier of claim 30 comprising two laterally opposing vents.

32. The seal carrier of claim 30 wherein the vent comprises a curvilinear cross-sectional geometry.

33. An ultrahigh-pressure fluid system comprising:
a plunger configured to reciprocate in the ultrahigh-pressure fluid system along a longitudinal axis;
a seal having a bore through which the plunger may reciprocate;
a bearing positioned adjacent the seal and having a bore through which the plunger may reciprocate;
a seal carrier including an inner surface and an outer surface, a first portion of the inner surface receiving the seal, and a second portion of the inner surface circumferentially surrounding the bearing; and
a recess formed along a circumference of the outer surface of the seal carrier, in a region on the outer surface at least partially opposite the first portion of the inner surface.

34. The ultrahigh-pressure fluid system of claim 33 wherein the first portion of the inner surface captively receives the seal.

35. The ultrahigh-pressure fluid system of claim 33 wherein the recess comprises a substantially arrowhead shaped cross-section having a curvilinear apex and pointing toward the inner surface of the seal carrier.

36. The ultrahigh-pressure fluid system of claim 33 wherein the recess is configured to promote a distribution of stresses induced on the seal carrier across a portion of a cross-section of the seal carrier, at least when the ultrahigh-pressure fluid system is in operation.

37. The ultrahigh-pressure fluid system of claim 33 wherein the first portion of the inner surface of the seal carrier circumferentially surrounds the seal.

38. The ultrahigh-pressure fluid system of claim 33 wherein the first portion of the inner surface comprises a first indent captively receiving the seal.

39. The ultrahigh-pressure fluid system of claim 38, further comprising:
   an o-ring wherein the first indent comprises a second indent formed in the inner surface of the seal carrier, circumferentially and longitudinally surrounding the o-ring, the o-ring being interposed between the seal and a portion of the inner surface forming at least a portion of the second indent.

40. The ultrahigh-pressure fluid system of claim 33 wherein the seal carrier farther comprises at least one vent in fluid communication with a surrounding environment and at least a portion of the inner surface of the seal carrier, the vent being configured to communicate fluid from adjacent the inner surface to the surrounding environment.

41. A sealing assembly for an ultrahigh-pressure fluid system having a plunger configured to reciprocate therein along a longitudinal axis, the sealing assembly comprising:
   a seal having a bore through which the plunger may reciprocate;
   a bearing positioned adjacent the seal and having a bore through which the plunger may reciprocate;
   a seal carrier including an inner surface and an outer surface, a first portion of the inner surface receiving the seal, and a second portion of the inner surface circumferentially surrounding the bearing; and
   at least one vent configured to be in fluid communication with a surrounding environment and at least a portion of the inner surface of the seal carrier, the vent being configured to communicate fluid from adjacent the inner surface to the surrounding environment.

42. A seal carrier assembly for an ultrahigh-pressure fluid system having a plunger configured to reciprocate therein along a longitudinal axis, the seal carrier assembly comprising:
   a bearing having a bore through which the plunger may reciprocate;
   a seal carrier having an inner surface and an outer surface, a first portion of the inner surface configured to receive a seal, and a second portion of the inner surface circumferentially surrounding the bearing; and
   at least one vent configured to be in fluid communication with a surrounding environment and at least a portion of the inner surface of the seal carrier, the vent being configured to communicate fluid from adjacent the inner surface to the surrounding environment.

43. A seal carrier for an ultrahigh-pressure fluid system having a plunger configured to reciprocate therein, the seal carrier comprising:
   an outer surface;
   an inner surface having a first portion configured to receive a seal, and a second portion configured to circumferentially surround a bearing; and
   at least one vent configured to be in fluid communication with a surrounding environment and at least a portion of the inner surface of the seal carrier, the vent being configured to communicate fluid from adjacent the inner surface to the surrounding environment.

44. An ultrahigh-pressure fluid system comprising:
   a plunger configured to reciprocate in the ultrahigh-pressure fluid system along a longitudinal axis;
   a seal having a bore through which the plunger may reciprocate;
   a bearing positioned adjacent the seal and having a bore through which the plunger may reciprocate;
   a seal carrier including an inner surface and an outer surface, a first portion of the inner surface receiving the seal, and a second portion of the inner surface circumferentially surrounding the bearing; and
   at least one vent configured to be in fluid communication with a surrounding environment and at least a portion of the inner surface of the seal carrier, the vent being configured to communicate fluid from adjacent the inner surface to the surrounding environment.

\* \* \* \* \*